United States Patent
Rejman (10) Patent No.: US 9,724,821 B2
(45) Date of Patent: Aug. 8, 2017

(54) HAND TOOL CASE HOLDING DEVICE

(71) Applicant: Robert Bosch GmbH, Stuttgart (DE)

(72) Inventor: Marcin Rejman, Waiblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 491 days.

(21) Appl. No.: 14/360,239

(22) PCT Filed: Nov. 7, 2012

(86) PCT No.: PCT/EP2012/072007
§ 371 (c)(1),
(2) Date: May 22, 2014

(87) PCT Pub. No.: WO2013/075943
PCT Pub. Date: May 30, 2013

(65) Prior Publication Data
US 2015/0129441 A1    May 14, 2015

(30) Foreign Application Priority Data

Nov. 22, 2011   (DE) .......................... 10 2011 086 801

(51) Int. Cl.
*B25H 3/02* (2006.01)
*H02J 7/00* (2006.01)
*H02J 50/10* (2016.01)

(52) U.S. Cl.
CPC .............. *B25H 3/02* (2013.01); *H02J 7/0042* (2013.01); *H02J 7/0044* (2013.01); *H02J 50/10* (2016.02)

(58) Field of Classification Search
CPC ...... H02J 7/0044; H02J 7/0045; H02J 7/0042; H02J 7/025; H02J 5/005; H02J 5/10; B25H 3/04; B25H 3/02
See application file for complete search history.

(56) References Cited

U.S. PATENT DOCUMENTS

| | | | | |
|---|---|---|---|---|
| 5,550,452 | A * | 8/1996 | Shirai | H02J 7/025 320/108 |
| 6,218,796 | B1 | 4/2001 | Kozlowski | |
| 7,462,951 | B1 | 12/2008 | Baarman | |
| 2006/0131193 | A1 | 6/2006 | Sherman | |
| 2009/0212737 | A1 | 8/2009 | Johnson et al. | |
| 2010/0289448 | A1 * | 11/2010 | Jung | H02J 7/025 320/108 |
| 2011/0006611 | A1 * | 1/2011 | Baarman | H01F 38/14 307/104 |

FOREIGN PATENT DOCUMENTS

| | | |
|---|---|---|
| CN | 1647342 A | 7/2005 |
| CN | 1922700 A | 2/2007 |
| CN | 201923584 U | 8/2011 |

(Continued)

*Primary Examiner* — Ryan Johnson
(74) *Attorney, Agent, or Firm* — Norton Rose Fulbright US LLP; Gerard Messina (57) ABSTRACT

A hand tool case holding device including at least one holding device, which is provided for the purpose of detachably holding a hand tool case in a case accommodating area. It is provided that the hand tool case holding device has at least one charging coil and a bearing arrangement, which is provided for the purpose of movably supporting the charging coil and the holding device in relation to one another.

11 Claims, 6 Drawing Sheets

(56) References Cited

FOREIGN PATENT DOCUMENTS

| | | |
|---|---|---|
| DE | 10 2008 058007 | 4/2010 |
| EP | 0 533 247 | 3/1993 |
| EP | 1 563 965 | 8/2005 |
| EP | 2 289 671 | 3/2011 |
| JP | 2010-256761 | 11/2010 |
| KR | 2011 0107728 | 10/2011 |
| TW | 201100217 A | 1/2011 |

* cited by examiner

HAND TOOL CASE HOLDING DEVICE

FIELD OF THE INVENTION

The present invention relates to a hand tool case holding device including at least one holding device, which is provided for the purpose of detachably holding a hand tool case in a case accommodating area.

BACKGROUND INFORMATION

A hand tool case holding device, including at least one holding device, which is provided for the purpose of detachably holding a hand tool case in a case accommodating area, is discussed in document DE 10 2008 058 007 B3.

SUMMARY OF THE INVENTION

The present invention is directed to a hand tool case holding device, including at least one holding device which is provided for the purpose of detachably holding a hand tool case in a case accommodating area of the hand tool case holding device.

It is provided that the hand tool case holding device has at least one charging coil and one bearing arrangement, which is provided for the purpose of movably supporting the charging coil and the holding device in relation to one another. A "holding device" is to be understood in particular as a device which is provided for the purpose, in at least one operating state, of preventing a movement of the hand tool case out of the case accommodating area. The holding device, in at least one operating state, which may be prevents a movement of the hand tool case independently of a direction of the movement.

The holding device may hold the hand tool case, at least during a charging operation, in a force-fit and/or advantageously in a form-locked manner. "Provided" is to be understood in particular to mean specially programmed, configured, and/or equipped. In particular, a "hand tool case" is to be understood as a case which, in a closed state, delimits a tool accommodating area in a shock-proof, moisture-proof, and/or dust-proof manner. The hand tool case may delimit the tool accommodating area at least partially in the form of a hand tool battery. The hand tool case may have at least one fastening arrangement for fastening a hand tool, a hand tool including an attached hand tool battery, and/or particularly may be a hand tool battery. The hand tool case may be magnetically passive and/or advantageously electrically passive. In particular, the hand tool case does not have any electrical equipment.

Alternatively or additionally, the hand tool case could have a charging coil and/or advantageously a magnetic field conductor, which receives the energy and relays it in a hard-wired and/or magnetic manner to a hand tool battery. The hand tool case may be configured according to the hand tool case provided in the publication DE 10 2008 058 007 B3, but it has a hand tool accommodating area and/or a hand tool battery accommodating area, which is provided for the purpose of accommodating an inductively chargeable hand tool battery during a charging operation. A "case accommodating area" is to be understood in particular to mean an area of the hand tool case holding device, in which the hand tool case is situated at least during a charging operation. A holding device housing of the hand tool case holding device may delimit the case accommodating area on at least one side. In particular, the term "detachable" is to be understood to mean that the holding device fastens the hand tool case in one state and this fastening is disconnectable nondestructively and/or reversibly by an operator in another state. The holding device may hold the hand tool case so it is detachable without tools. The phrase "detachable without tools" is to be understood to mean in particular that a connection of the holding device to the hand tool case is implemented to be detachable manually by an operator. The holding device and/or advantageously the hand tool case may have/have at least one operating element, which detaches a fastening of the hand tool case on the holding device in the event of an actuation by an operator. A "charging coil" is to be understood in particular to mean a coil which receives and/or transmits energy during a charging operation. The charging coil of the hand tool case holding device may transmit energy during a charging operation, which a charging coil of a hand tool and/or advantageously a hand tool battery, situated in the case accommodating area, receives. The charging coil may include at least one coil winding, one coil core, and in particular one coil housing, which at least connects the coil winding and the coil core.

A "bearing arrangement" is to be understood in this context in particular as an arrangement which is provided for the purpose of keeping the charging coil on a provided path during a movement. The bearing arrangement may cause bearing forces on the charging coil, which are aligned perpendicularly to a direction of the movement of the charging coil. The bearing arrangement may guide the charging coil using an at least temporarily linear, which may be translational, movement. The phrase "movable in relation to one another" is to be understood to mean in particular that the charging coil is situated differently in relation to the holding device in two operating states. By way of the embodiment according to the present invention of the hand tool case holding device, a play of the holding device during a fastening of the hand tool case may advantageously be compensated for, and therefore the charging coil may be reliably positioned. Therefore, a high efficiency during energy transfer may be achieved using a user-friendly holding device having a simple configuration. In particular, the charging coil may be positioned particularly close to a charging coil situated in the case accommodating area.

Furthermore, it is provided that the bearing arrangement is provided for the purpose of movably supporting the charging coil in the direction of the case accommodating area, whereby advantageous positioning in the event of play in parallel to an action direction of the charging coil is possible with a particularly simple configuration. The phrase "in the direction of the case accommodating area" is to be understood in particular to mean that a movement of the charging coil parallel to this direction moves the charging coil closer to or farther away from a hand tool case situated in the case accommodating area. The direction may be aligned nonparallel to a surface of the hand tool case, which is situated closest to the charging coil, situated in the case accommodating area.

In one advantageous embodiment of the present invention, it is provided that the hand tool case holding device has at least one force element, which is provided for the purpose of causing a force, which presses at least the charging coil in the direction of the case accommodating area, whereby advantageous automatic positioning may be achieved in the event of play in parallel to an action direction of the charging coil. In particular, a "force element" is to be understood as an element which appears reasonable to those skilled in the art, but which may be a pneumatic element, a magnetic element, and/or particularly may be a spring element. A "spring element" is to be understood in particular as a component which is elastically deformable by a force by at least 10%, which may be at least 20%, particularly may be at least 50% in an extension in a normal operating state. The spring element may generate, in the event of a change of the extension, a counterforce which is dependent on the change of the extension, in particular is proportional to the change, and which counteracts the change. The spring element may be configured as a spring which appears reasonable to those skilled in the art, but advantageously as a coil spring.

Furthermore, it is provided that the force element and the bearing arrangement are implemented at least partially in one piece, whereby lower production and configuration expenditures and therefore lower costs per piece are possible. The phrase "at least partially implemented in one piece" is to be understood to mean in particular that they are integrally joined, for example, by a welding process and/or a gluing process, etc., and particularly advantageously are molded on, for example, by the manufacturing from a casting and/or by the manufacturing in a single component or multi-component injection molding method.

Furthermore, it is provided that the force element and the bearing arrangement are implemented separately, whereby a particularly precise, smooth running, and long-lasting configuration may be achieved. In particular, the phrase "implemented separately" is to be understood to mean that the force element and the bearing arrangement are manufactured in different manufacturing steps. The force element and the bearing arrangement may act independently of one another on the charging coil in at least one operating state. The force element and the bearing arrangement are advantageously implemented as different components.

In addition, it is provided that the holding device has at least one holding arrangement, which is provided for the purpose of latching the hand tool case, whereby a particularly stable, user-friendly, and in particular automatically closing fastening is possible with a simple configuration. A "holding arrangement" is to be understood in particular as a arrangement which causes a force to act directly on the tool case in at least one operating state for a fastening of the tool case. The holding arrangement may be implemented as corresponding to a holding arrangement and/or according to a holding arrangement in publication DE 10 2008 058 007 B3. In particular, "latching" is to be understood to mean that a holding arrangement is elastically deflected during a fastening operation of the hand tool case, to subsequently hook behind a corresponding holding arrangement by way of a force acting on the holding arrangement. The elastically deflectable holding arrangement may be situated on the hand tool case and the corresponding holding arrangement is situated on the hand tool case holding device.

Furthermore, it is provided that the charging coil is provided for the purpose of transferring energy to a charging coil situated in the case accommodating area, whereby it is possible to inductively charge a hand tool battery without removing it from the hand tool case. In particular, the term "transferred" is to be understood to mean that the charging coil transmits electrical energy with the aid of a magnetic alternating field to the charging coil situated in the case accommodating area. The charging coil situated in the case accommodating area may be part of the hand tool case and/or may particularly be part of a hand tool battery situated in the hand tool case. A "hand tool battery" is to be understood in particular as a battery which is provided for the purpose of supplying a hand tool with energy. The battery may be connected to the hand tool so it is detachable without tools. Alternatively or additionally, a hand tool battery could also be integrated in the hand tool. In particular, a "hand tool" is to understood as a portable tool which appears reasonable to those skilled in the art, but advantageously a drill, a drill hammer, a percussion hammer, a saw, a plane, a screwdriver, a milling machine, a grinder, an angle grinder, a gardening tool, a construction site measuring device, and/or a multifunction tool.

In one advantageous embodiment of the present invention, it is provided that the hand tool case holding device has a holding device housing, which is implemented at least partially in one piece with the bearing arrangement, whereby lower production and configuration expenditures and therefore lower costs per piece are possible. A "holding device housing" is to be understood as a unit which mechanically connects at least the holding device and the bearing arrangement in an operationally ready state. The holding device housing may enclose an interior chamber, in which a charging electronic system of the hand tool case holding device is advantageously situated. A "charging electronic system" is to be understood in particular as an electronic system which monitors a charge state of a hand tool battery and controls and/or may regulate a charging operation of the hand tool battery depending thereon.

Furthermore, it is provided that the hand tool case holding device includes a holding device housing, which is implemented separately from the bearing arrangement, whereby a particularly precise, smooth running, and long-lasting configuration may be achieved.

Furthermore, it is provided that the force element movably supports at least one area of the holding device housing, whereby lower production and configuration expenditures and therefore lower costs per piece are possible. An "area of the holding device housing" is to be understood in particular as a component which delimits the interior chamber of the holding device of the hand tool case in at least one operating state or is implemented integrally with such a component.

In addition, it is provided that the force element is situated action-oriented between the holding device housing and the charging coil, whereby a structurally simple force element is usable. In particular, the phrase "action-oriented between the holding device housing and the charging coil" is to be understood to mean that the force element supports a force, which acts on the charging coil, on the holding device housing.

Furthermore, a system including a hand tool case holding device according to the present invention and at least one hand tool case is provided, which has at least one holding device corresponding to the holding device of the hand tool case holding device, whereby the hand tool case holding device is advantageously connectable to various hand tool cases. In this context, "corresponding" is to be understood in particular to mean that the holding device of the hand tool case is provided for the purpose of establishing a detachable mechanical connection to the holding device of the hand tool case holding device. The hand tool case may have, in addition to the first holding device, a second holding device, which is implemented as corresponding to a first holding device of a hand tool case, whereby multiple hand tool cases may advantageously be stacked and in particular transported while connected with the aid of the holding devices. The second holding device of the hand tool case may be implemented identically to the holding device of the hand tool case holding device.

Further advantages result from the following description of the drawings. Five exemplary embodiments of the present invention are shown in the drawings. The drawings, the description, and the claims contain numerous features in combination. Those skilled in the art will advantageously also consider the features individually and combine them to form further reasonable combinations.

DETAILED DESCRIPTION

Figure 1:
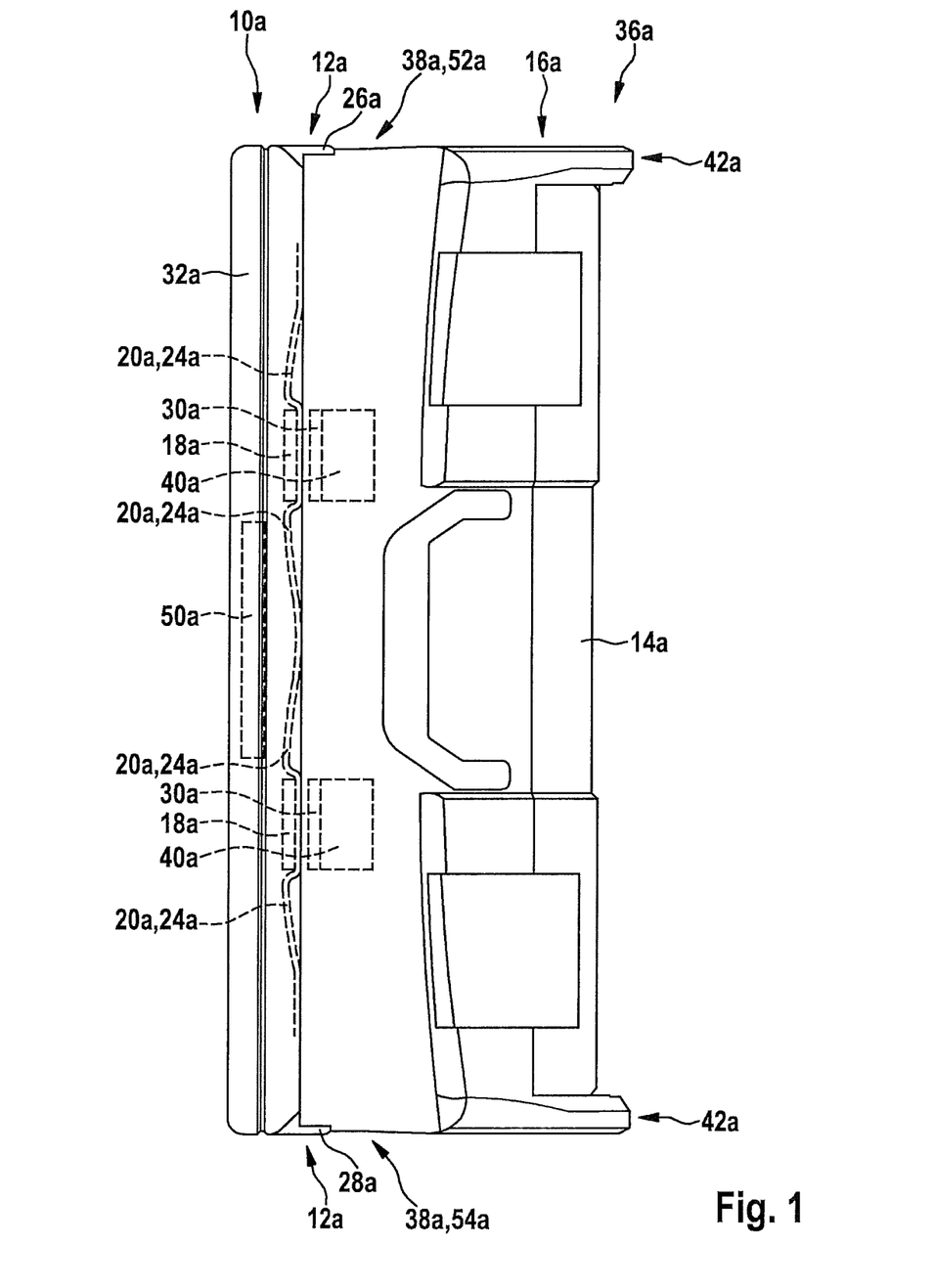
FIG. 1 shows a system according to the present invention including a hand tool case and a hand tool case holding device.
Figure 2:
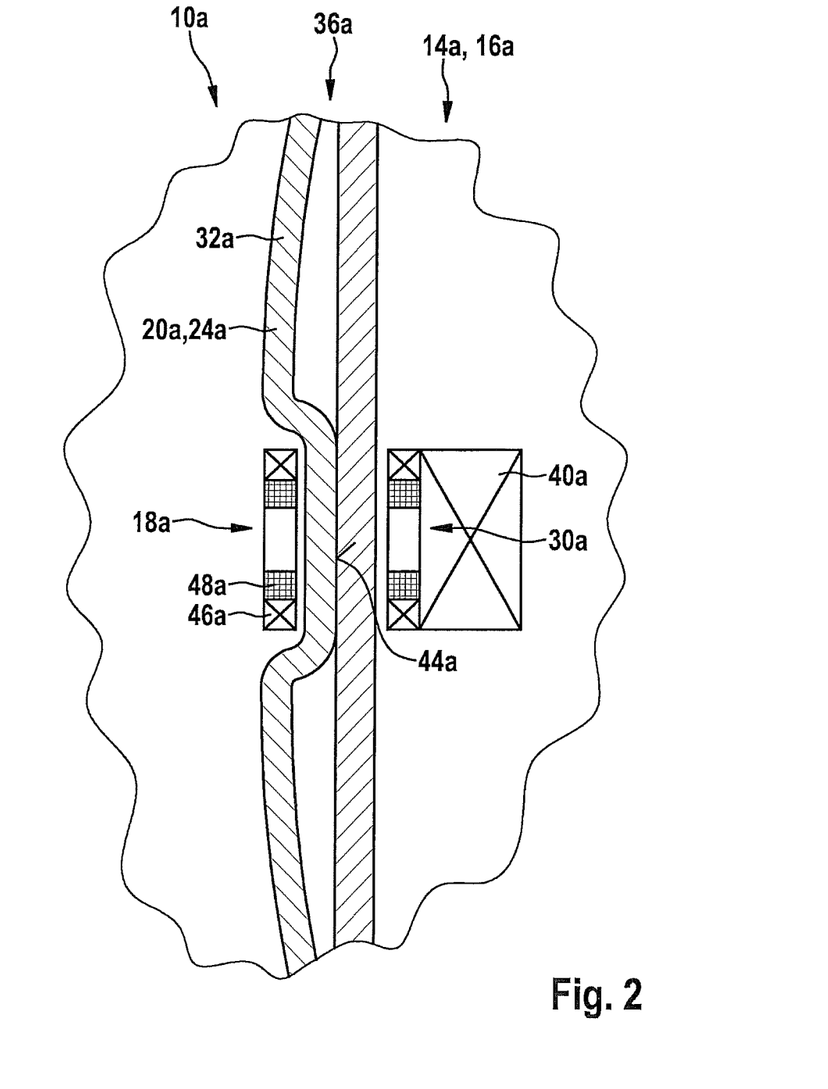
FIG. 2 shows a holding device housing, a charging coil, and a bearing arrangement of the hand tool case holding device from FIG. 1 in a schematic sectional view, the bearing arrangement being implemented in one piece with a side wall of the holding device housing.

FIGS. 1 and 2 show a system 36a including a hand tool case holding device 10a, a hand tool case 14a, and two hand tool batteries 40a. Hand tool batteries 40a are situated during a charging operation in hand tool case 14a. Hand tool case holding device 10a has a holding device 12a, which, during a charging operation of hand tool battery 40a, detachably holds hand tool case 14a in a case accommodating area 16a of hand tool case holding device 10a. Hand tool case 14a has a first holding device 38a, which corresponds to holding device 12a of hand tool case holding device 10a. Hand tool case 14a has a second holding device 42a, which is implemented corresponding to holding device 12a of hand tool case holding device 10a. Second holding device 42a of hand tool case 14a is therefore provided for the purpose of establishing a detachable connection to a first holding device of another hand tool case.

Hand tool case holding device 10a includes two charging coils 18a, two bearing arrangement 20a, two force elements 24a, and a holding device housing 32a. At least one of charging coils 18a transfers charging energy during the charging operation to a charging coil 30a, which is situated in case accommodating area 16a, of one of hand tool batteries 40a. Bearing arrangement 20a each movably support one of charging coils 18a and holding device 12a in relation to one another. Bearing arrangements 20a are each implemented in one piece with one of force elements 24a. Bearing arrangement 20a and force elements 24a are implemented in one piece with holding device housing 32a. Bearing arrangement 20a and force elements 24a are implemented as essentially flat, ring-shaped areas of a wall of holding device housing 32a. Hand tool case 14a is implemented as thin-walled in the area of bearing arrangement 20a and force elements 24a. Charging coils 18a are each connected to an area of holding device housing 32a which is enclosed by the ring-shaped areas.

Bearing arrangement 20a are deformable by an operator by way of fastening hand tool case 14a in case accommodating area 16a. When case accommodating area 16a is free of a hand tool case 14a, the at least one charging surface 44a of hand tool case holding device 10a, through which charging coil 18a transmits charging energy, is situated in case accommodating area 16a. Charging coil 18a of hand tool case holding device 10a is also partially situated in case accommodating area 16a. Charging surface 44a is an outer surface of holding device housing 32a.

Bearing arrangement 20a movably support charging coils 18a in the direction of case accommodating area 16a. In case of an insertion of hand tool case 14a into case accommodating area 16a, hand tool case 14a presses charging surface 44a of hand tool case holding device 10a out of case accommodating area 16a. During the charging operation, force elements 24a cause forces which press charging coil 18a in the direction of case accommodating area 16a. Bearing arrangement 20a presses charging surface 44a of hand tool case holding device 10a against hand tool case 14a.

Charging coils 18a each have a conductor loop 46a and a coil core 48a. Charging coils 18a are provided for the purpose of transferring energy perpendicularly to charging surface 44a to a charging coil 30a, which is situated in case accommodating area 16a, of hand tool battery 40a. Hand tool case holding device 10a includes a charging electronic system 50a, which is provided for the purpose of regulating a charging operation of hand tool battery 40a. For this purpose, charging electronic system 50a communicates in a way which appears reasonable to those skilled in the art with charging electronic system 50a.

Holding device 12a of hand tool case holding device 10a has two holding arrangement 26a, 28a, which are provided for the purpose of latching so they are detachable without tools with the two holding arrangement 52a, 54a of hand tool case 14a. Holding arrangement 52a, 54a of hand tool case holding device 10a are implemented as latch depressions. Holding arrangement 52a, 54a of hand tool case 14a are implemented as engagement hooks. Holding arrangement 52a, 54a of hand tool case 14a latch with a movement outward. Holding arrangement 26a, 28a of hand tool case holding device 10a are situated on two opposing sides of case accommodating area 16a.

FIGS. 3 through 6 show four further exemplary embodiments of the present invention. The following descriptions and the drawings are essentially restricted to the differences between the exemplary embodiments, reference also fundamentally being able to be made to the drawings and/or the description of the other exemplary embodiments, in particular of FIGS. 1 and 2, with respect to identically designated components, in particular with respect to components having identical reference numerals. To differentiate the exemplary embodiments, the letter a is affixed to the reference numerals of the exemplary embodiment in FIGS. 1 and 2. In the exemplary embodiments of FIGS. 3 through 6, the letter a is replaced by the letters b through e.

Figure 3:
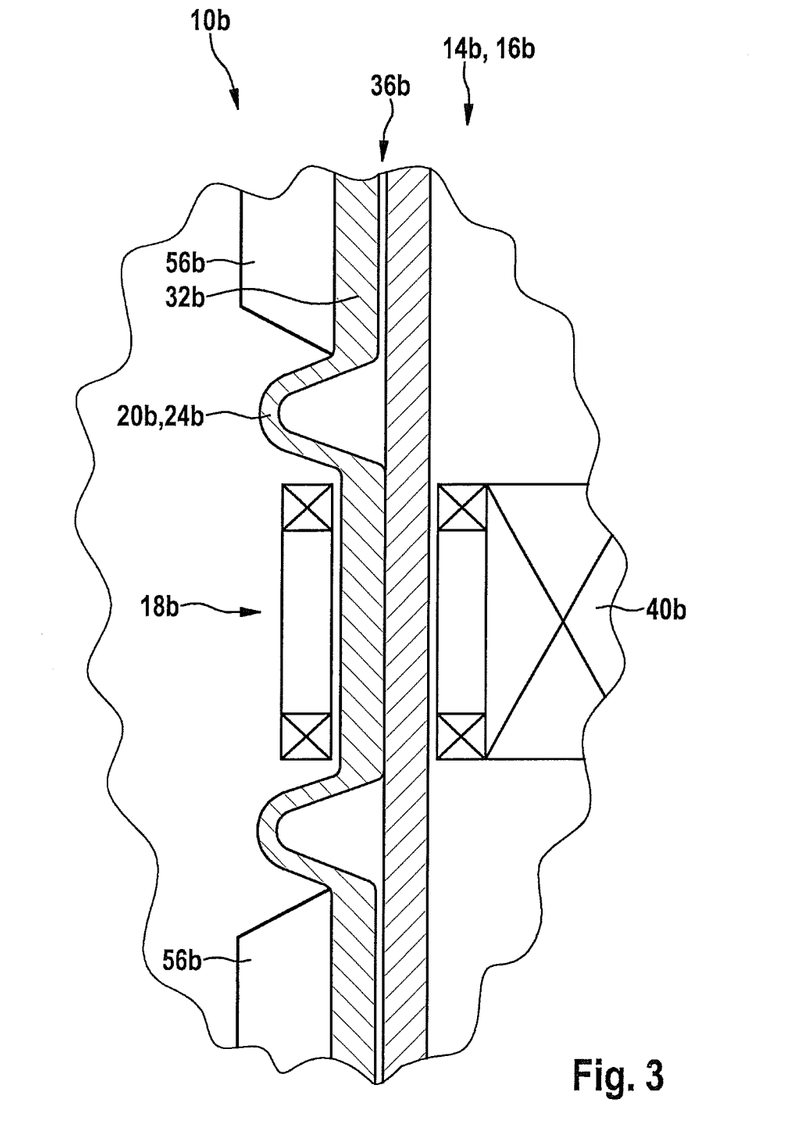
FIG. 3 shows an alternative exemplary embodiment of the bearing arrangement from FIG. 2 in a schematic sectional view, the bearing arrangement being implemented as a U-shaped area of the holding device housing.

FIG. 3 shows a sectional view of a system 36b including a hand tool case holding device 10b, a hand tool case 14b, and a hand tool battery 40b. Hand tool case holding device 10b includes a holding device shown in FIG. 1, which, during a charging operation, detachably fastens hand tool case 14b in a case accommodating area 16b of hand tool case holding device 10b. Hand tool case holding device 10b includes a charging coil 18b, a bearing arrangement 20b, a force element 24b, and a holding device housing 32b. Bearing arrangement 20b and force element 24b are implemented in one piece. Bearing arrangement 20b and force element 24b are implemented in one piece with holding device housing 32b.

Bearing arrangement 20b movably supports charging coil 18b and the holding device in relation to one another. Force element 24b causes a force, at least during a charging operation, which presses charging coil 18b in the direction of case accommodating area 16b. Bearing arrangement 20b and force element 24b are implemented as a flexible area of holding device housing 32b. The area of bearing arrangement 20b and force element 24b is implemented as ring-shaped having a U-shaped cross-section in parallel to an action direction of charging coil 18b. Hand tool case 14b has stiffening ribs 56b, which stiffen an area adjoining the area of bearing arrangement 20b and force element 24b.

Figure 4:
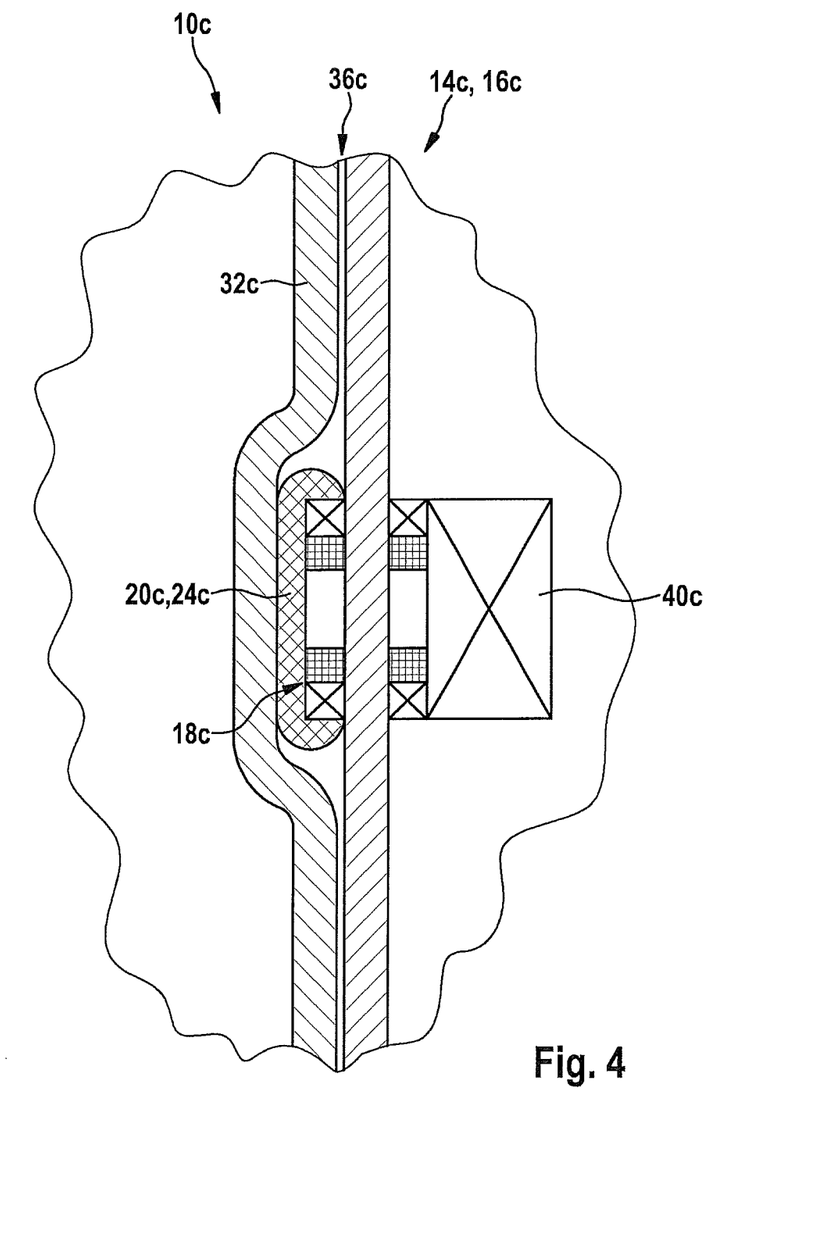
FIG. 4 shows an alternative exemplary embodiment of the bearing arrangement from FIG. 2 in a schematic sectional view, the bearing arrangement being situated outside a holding device housing of a hand tool case holding device.

FIG. 4 shows a sectional view of a system 36c including a hand tool case holding device 10c, a hand tool case 14c, and a hand tool battery 40c. Hand tool case holding device 10c includes a holding device, which is shown in FIG. 1, and which, during a charging operation, detachably holds hand tool case 14c in a case accommodating area 16c of hand tool case holding device 10c. Hand tool case holding device 10c includes a charging coil 18c, a bearing arrangement 20c, a force element 24c, and a holding device housing 32c. Bearing arrangement 20c and force element 24c are implemented in one piece. Bearing arrangement 20c and force element 24c are implemented separately from holding device housing 32c. Force element 24c is situated action-oriented between holding device housing 32c and charging coil 18c.

Bearing arrangement 20c movably supports charging coil 18c and the holding device in relation to one another. Force element 24c causes, at least during a charging operation, a force which presses charging coil 18c in the direction of case accommodating area 16c. Bearing arrangement 20c and force element 24c are implemented as a cushion deformable by hand tool case 14c. Charging coil 18c is molded in one side of force element 24c. Bearing arrangement 20c and force element 24c are situated on an outer side of holding device housing 32c. Bearing arrangement 20c is therefore situated during a charging operation between holding device housing 32c and hand tool case 14c.

Figure 5:
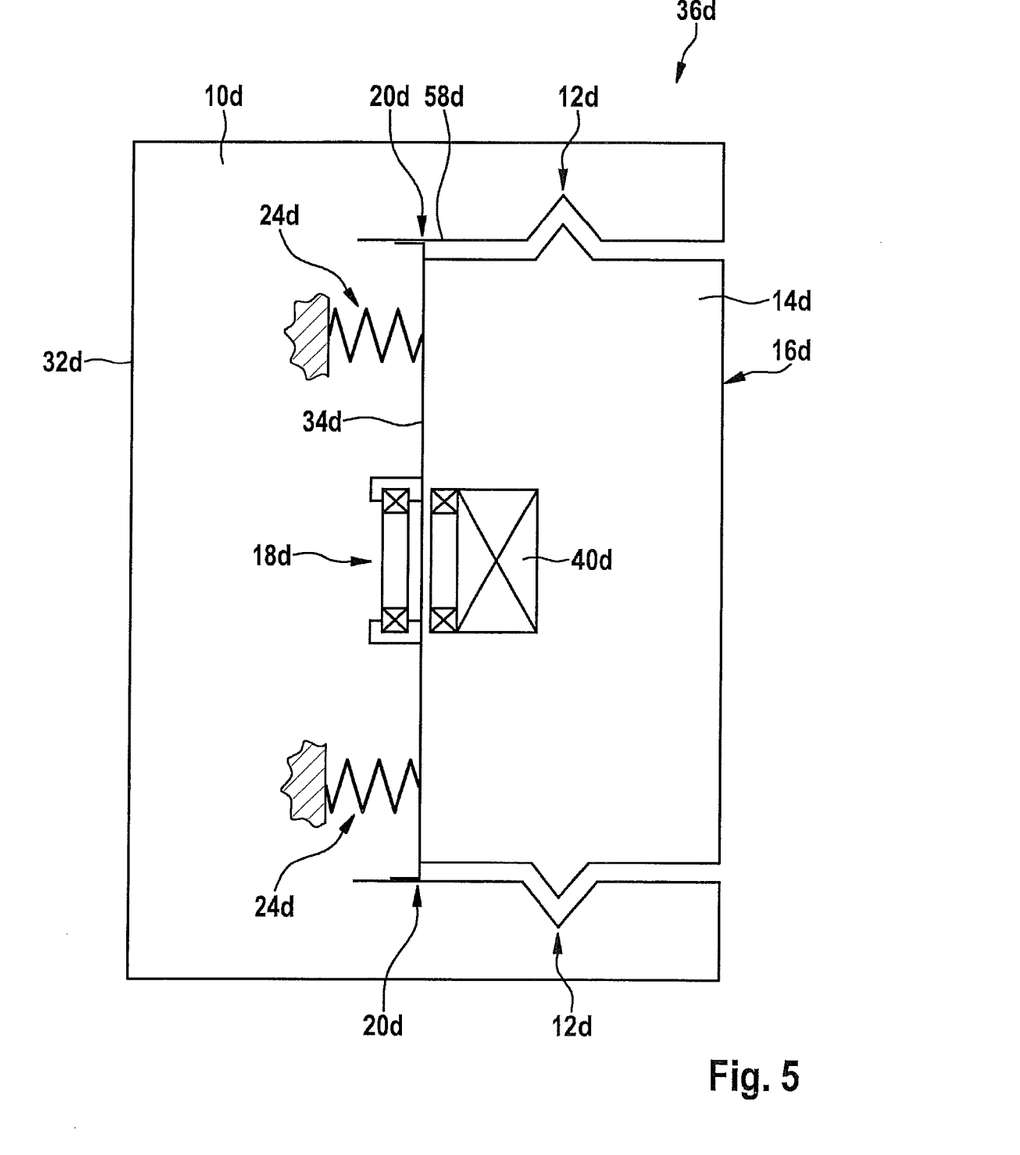
FIG. 5 shows an alternative exemplary embodiment of the system from FIG. 1 in a schematic sectional view, the bearing arrangement movably supporting the charging coil and a part of the holding device housing.

FIG. 5 shows a sectional view of a system 36d including a hand tool case holding device 10d, a hand tool case 14d, and a hand tool battery 40d. Hand tool case holding device 10d includes a holding device 12d, which, during a charging operation, detachably holds hand tool case 14d in a case accommodating area 16d of hand tool case holding device 10d. Hand tool case holding device 10d includes a charging coil 18d, a bearing arrangement 20d, two force elements 24d, and a holding device housing 32d. Bearing arrangement 20d and force elements 24d are implemented separately. Force elements 24d are implemented separately from holding device housing 32d. Bearing arrangement 20d is partially implemented in one piece with holding device housing 32d.

Holding device housing 32d is constructed in multiple parts. Bearing arrangement 20d movably supports a first area 58d of holding device housing 32d in relation to a second area 34d of holding device housing 32d of hand tool case 14d. First area 58d of holding device housing 32d is immobile in relation to holding device 12d. Second area 34d of holding device housing 32d is immobile in relation to charging coil 18d. Bearing arrangement 20d therefore movably supports charging coil 18d and holding device 12d in relation to one another. Force elements 24d cause, at least during a charging operation, a force which presses charging coil 18d in the direction of case accommodating area 16d. For this purpose, force elements 24d are situated action-oriented between first area 58d and second area 34d. Force elements 24d are implemented as springs.

Figure 6:
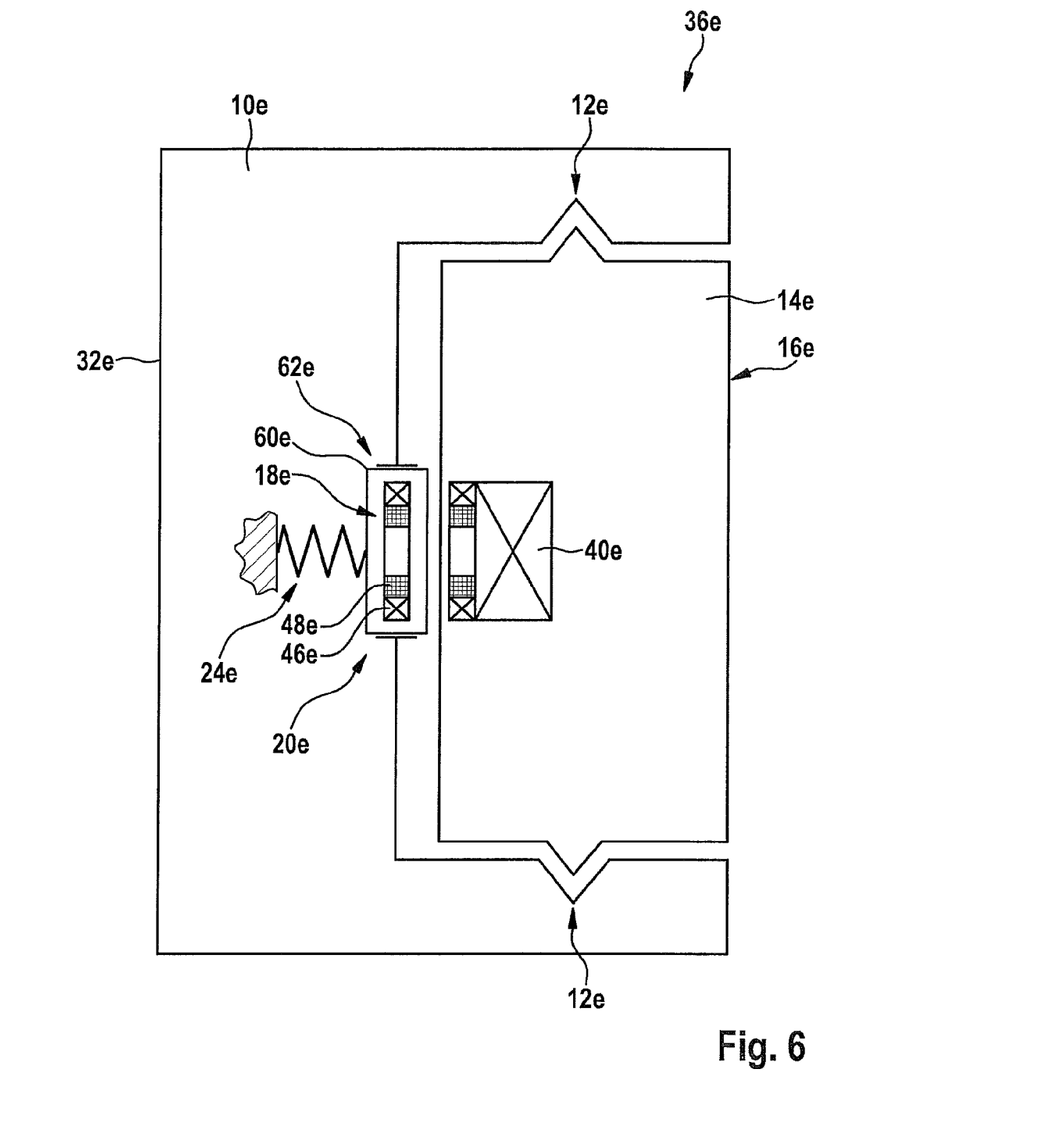
FIG. 6 shows an alternative exemplary embodiment of the system from FIG. 1 in a schematic sectional view, the bearing arrangement movably supporting the charging coil in a recess of the holding device housing.

FIG. 6 shows a sectional view of a system 36e including a hand tool case holding device 10e, a hand tool case 14e, and a hand tool battery 40e. Hand tool case holding device 10e includes a holding device 12e, which, during a charging operation, detachably holds hand tool case 14e in a case accommodating area 16e of hand tool case holding device 10e. Hand tool case holding device 10e includes a charging coil 18e, a bearing arrangement 20e, a force element 24e, and a holding device housing 32e. Bearing arrangement 20e and force element 24e are implemented separately. Force element 24e is implemented separately from holding device housing 32e. Bearing arrangement 20e is partially implemented in one piece with holding device housing 32e.

Charging coil 18e has a coil housing 60e, which connects a conductor loop 46e and a coil core 48e of charging coil 18e. Coil housing 60e is partially implemented in one piece with bearing arrangement 20e. Bearing arrangement 20e movably supports charging coil 18e and holding device 12e in relation to one another. Holding device housing 32e has a recess 62e, in which charging coil 18e is movably supported. Force element 24e causes, at least during a charging operation, a force which presses charging coil 18e in the direction of case accommodating area 16e. For this purpose, force element 24e is situated action-oriented between coil housing 60e and holding device housing 32e. Force element 24e is implemented as a spring.

What is claimed is:

1. A hand tool case holding device, comprising:
   at least one holding device for detachably holding a hand tool case in a case accommodating area;
   at least one charging coil; and
   a bearing arrangement for movably supporting the charging coil and the holding device in relation to one another,
   wherein the bearing arrangement is configured for movably supporting the charging coil in the direction of the case accommodating area by pressing the charging coil in the direction of the case accommodating area.

2. The hand tool case holding device of claim 1, further comprising:
   at least one force element for causing a force, which presses at least the charging coil in the direction of the case accommodating area.

3. The hand tool case holding device of claim 2, wherein the force element and the bearing arrangement are implemented in one piece.

4. The hand tool case holding device of claim 2, wherein the force element and the bearing arrangement are implemented separately.

5. The hand tool case holding device of claim 1, wherein the holding device has at least one holding arrangement for latching the hand tool case.

6. The hand tool case holding device of claim 1, wherein the charging coil is configured for transferring energy to a charging coil situated in the case accommodating area.

7. The hand tool case holding device of claim 1, further comprising:
   a holding device housing implemented in one piece with the bearing arrangement.

8. The hand tool case holding device of claim 1, further comprising:
   a holding device housing implemented separately from the bearing arrangement.

9. The hand tool case holding device of claim 2, wherein the force element movably supports at least one area of the holding device housing.

10. A hand tool case holding device, comprising:
- at least one holding device for detachably holding a hand tool case in a case accommodating area;
- at least one charging coil;
- a bearing arrangement for movably supporting the charging coil and the holding device in relation to one another; and
- at least one force element for causing a force, which presses at least the charging coil in the direction of the case accommodating area,
- wherein the force element is situated action-oriented between the holding device housing and the charging coil.

11. A system, comprising:
- a hand tool case holding device, including at least one holding device for detachably holding a hand tool case in a case accommodating area, at least one charging coil, and a bearing arrangement for movably supporting the charging coil and the holding device in relation to one another; and
- the hand tool case, which has at least one holding device corresponding to the holding device of the hand tool case holding device,
- wherein the bearing arrangement is configured for movably supporting the charging coil in the direction of the case accommodating area by pressing the charging coil in the direction of the case accommodating area.

* * * * *